(12) United States Patent
Zhang (10) Patent No.: US 10,951,804 B2
(45) Date of Patent: Mar. 16, 2021

(54) PHOTOGRAPHING SYNCHRONIZATION METHOD AND APPARATUS

(71) Applicant: SHENZHEN KANDAO TECHNOLOGY CO., LTD., Shenzhen (CN)

(72) Inventor: Yu Zhang, Shenzhen (CN)

(73) Assignee: SHENZHEN KANDAO TECHNOLOGY CO., LTD., Shenzhen (CN)

( * ) Notice: Subject to any disclaimer, the term of this patent is extended or adjusted under 35 U.S.C. 154(b) by 93 days.

(21) Appl. No.: 16/478,581

(22) PCT Filed: Aug. 8, 2016

(86) PCT No.: PCT/CN2016/093969
§ 371 (c)(1),
(2) Date: Jul. 17, 2019

(87) PCT Pub. No.: WO2018/010240
PCT Pub. Date: Jan. 18, 2018

(65) Prior Publication Data
US 2020/0045221 A1 Feb. 6, 2020

(30) Foreign Application Priority Data
Jul. 11, 2016 (CN) .......................... 201610542160.8

(51) Int. Cl.
*H04N 5/232* (2006.01)
*H04N 7/56* (2006.01)

(52) U.S. Cl.
CPC ..... *H04N 5/23203* (2013.01); *H04N 5/23216* (2013.01); *H04N 5/23238* (2013.01); *H04N 5/23245* (2013.01); *H04N 7/56* (2013.01)

(58) Field of Classification Search
CPC .......... H04N 5/23203; H04N 5/23216; H04N 5/23238; H04N 5/23245; H04N 7/56;
(Continued)

(56) References Cited

U.S. PATENT DOCUMENTS

| 2009/0040293 A1 | 2/2009 | Foo et al. | |
| 2012/0134282 A1* | 5/2012 | Tirronen | H04W 4/80 370/252 |
| 2015/0278988 A1* | 10/2015 | MacMillan | H04N 5/2253 348/218.1 |

FOREIGN PATENT DOCUMENTS

| CN | 103369229 A | 10/2013 |
| CN | 103813129 A | 5/2014 |

(Continued)

OTHER PUBLICATIONS

State Intellectual Property Office of People's Republic of China, "International Search Report for PCT Application No. PCT/CN2016/093969", China, dated Apr. 5, 2017.

*Primary Examiner* — Mekonnen D Dagnew
(74) *Attorney, Agent, or Firm* — Tim Tingkang Xia Esq.; Locke Lord LLP (57) ABSTRACT

The present invention provides a photographing synchronization method for performing a synchronous photographing operation on a plurality of cameras using any one of cameras in a multi-camera system. The method comprises: obtaining all cameras in a current synchronous network by means of network broadcast; obtaining signal transmission delays between the cameras; generating a synchronous photographing instruction of each camera according to the signal transmission delays between the cameras; and sending the synchronous photographing instructions to particular cameras over a wireless network.

19 Claims, 4 Drawing Sheets

(58) Field of Classification Search
CPC ........... H04N 5/23225; H04N 5/23206; H04N 5/247; H04N 5/04
See application file for complete search history.

(56) References Cited

FOREIGN PATENT DOCUMENTS

| | | |
|---|---|---|
| CN | 103957344 A | 7/2014 |
| CN | 104426588 A | 3/2015 |
| CN | 104427228 A | 3/2015 |
| CN | 105208245 A | 12/2015 |
| CN | 105554594 A | 5/2016 |

* cited by examiner

PHOTOGRAPHING SYNCHRONIZATION METHOD AND APPARATUS

CROSS REFERENCE TO RELATED APPLICATIONS

This application claims the priority benefit of Chinese Patent Application No. 201610542160.8, entitled "PHOTOGRAPHING SYNCHRONIZATION METHOD AND PHOTOGRAPHING SYNCHRONIZATION DEVICE" and filed on Jul. 11, 2016, the content of which is incorporated by reference herein in its entirety for all purposes.

FIELD

The present disclosure relates to the field of multimedia content production, and more particularly, to a photographing synchronization method and a photographing synchronization device.

BACKGROUND

With the development of science and technology, the use of computer vision is much more common. In order to achieve better computer vision effect, when collecting images, multiple cameras are usually used to synchronously capture images. For example, currently popular cameras with multiple camera system, such as panorama cameras, VR cameras and light-field cameras, are involved in multiple camera cooperation. For example, three-dimensional modeling of an object using multi-camera shooting, sports and motion analysis using multi-angle shooting or vision quality detection system.

At present, the common synchronization photographing operation of multi-camera usually includes triggering image acquisition of digital signals from dedicated I/O ports on the cameras. When using the above-mentioned setting, each camera must use additional cables equipped with appropriate plugs and is connected to the cables through the plugs, which makes installation more complex and is inconvenient to use. Moreover, the multiple camera system usually have a higher production cost, meanwhile, high quality cables are employed by complete the synchronous operation of the multi-camera.

Therefore, it is necessary to provide a photographing synchronization method and a photographing synchronization device, so as to solve existing problems in the existing technology.

SUMMARY

Exemplary embodiments of the present disclosure provide a photographing synchronization method and a photographing synchronization device with easy setup and operation and lower production cost of a corresponding multi-camera system, which solves the technical problems in the existing photographing synchronization device, such as difficulty of installation, inconvenience of use, and higher production cost of the corresponding multi-camera system.

According to a first aspect of the disclosure, it provides a photographing synchronization method, using any camera in a multi-camera system to control multiple cameras for synchronization photographing operation, wherein, the photographing synchronization method includes:

acquiring all cameras in a current synchronization network by the way of network broadcasting;

obtaining a public feature point in a photographing public area of two cameras;

determining transmission delay of signals between the two camera according to a time difference that the public feature point appears in images photographed by the two cameras;

generating a synchronization photographing instruction of each camera according to the transmission delay of signals between each camera;

transmitting the synchronization photographing instruction to the corresponding camera by means of a wireless network;

determining whether synchronization photographing feedback instructions of all the cameras in the current synchronization network are received or not, wherein, the synchronization photographing feedback instruction is generated by the camera according to the synchronization photographing instruction;

determining whether the cameras corresponding to received synchronization photographing feedback instructions include all specific cameras or not when the synchronization photographing feedback instructions of all the cameras in the current synchronization network are not received in a predetermined time; and transmitting synchronization photographing interrupt instructions to all the cameras in the current synchronization network by means of the wireless network when the cameras corresponding to received synchronization photographing feedback instructions do not include all the specific cameras.

In the photographing synchronization method of the present disclosure, the photographing synchronization method further includes: receiving frame synchronization photographing images taken by the cameras and synchronizing the frame synchronization photographing images to other electronic terminal devices.

In the photographing synchronization method of the present disclosure, the network broadcasting of mDNS is used to acquire all the cameras in the current synchronization network; the D-bus communication mechanism is used to send the synchronization photographing instruction to the corresponding camera.

In the photographing synchronization method of the present disclosure, the current synchronization network composed of all the cameras is a peer to peer networking; the wireless network comprises: a Zigbee wireless communication network, a Wi-Fi wireless network or a Bluetooth wireless network.

According to a second aspect of the disclosure, it provides a photographing synchronization method, using any camera in a multi-camera system to control multiple cameras for synchronization photographing operation, wherein, the photographing synchronization method includes:

acquiring all cameras in a current synchronization network by the way of network broadcasting;

acquiring transmission delay of signals between each camera;

generating a synchronization photographing instruction of each camera according to the transmission delay of signals between each camera; and transmitting the synchronization photographing instruction to the corresponding camera by means of a wireless network so as to realize frame synchronization photographing for all the cameras in the multi-camera system.

In the photographing synchronization method of the present disclosure, the step of acquiring transmission delay of signals between each camera includes:

establishing at least once handshake connection between two cameras; and determining the transmission delay of signals between two camera according to the handshake connection time of establishing the handshake connection between the two cameras.

In the photographing synchronization method of the present disclosure, the step of acquiring transmission delay of signals between each camera includes:

obtaining a public feature point in a photographing public area of two cameras; and determining the transmission delay of signals between two camera according to a time difference that the public feature point appears in the images photographed by the two cameras.

In the photographing synchronization method of the present disclosure, the photographing synchronization method further includes:

determining whether synchronization photographing feedback instructions of all the cameras in the current synchronization network are received or not, wherein, the synchronization photographing feedback instruction is generated by the camera according to the synchronization photographing instruction; and transmitting synchronization photographing interrupt instructions to all the cameras in the current synchronization network by means of the wireless network when the synchronization photographing feedback instructions of all the cameras in the current synchronization network are not received in a predetermined time.

In the photographing synchronization method of the present disclosure, the photographing synchronization method further includes:

determining whether synchronization photographing feedback instructions of all the cameras in the current synchronization network are received or not, wherein, the synchronization photographing feedback instruction is generated by the camera according to the synchronization photographing instruction;

determining whether the cameras corresponding to received synchronization photographing feedback instructions include all specific cameras or not when the synchronization photographing feedback instructions of all the cameras in the current synchronization network are not received in the predetermined time; and transmitting synchronization photographing interrupt instructions to all the cameras in the current synchronization network by means of the wireless network when the cameras corresponding to received synchronization photographing feedback instructions do not include all the specific cameras.

In the photographing synchronization method of the present disclosure, the photographing synchronization method further includes:

receiving frame synchronization photographing images taken by the cameras and synchronizing the frame synchronization photographing images to other electronic terminal devices.

In the photographing synchronization method of the present disclosure, the network broadcasting of mDNS is used to acquire all the cameras in the current synchronization network.

In the photographing synchronization method of the present disclosure, the D-bus communication mechanism is used to send the synchronization photographing instruction to the corresponding camera.

In the photographing synchronization method of the present disclosure, the current synchronization network composed of all the cameras is a peer to peer networking.

In the photographing synchronization method of the present disclosure, the wireless network comprises: a Zigbee wireless communication network, a Wi-Fi wireless network or a Bluetooth wireless network.

According to a third aspect of the disclosure, it provides a photographing synchronization device, the photographing synchronization device includes:

a camera acquiring module, configured to acquire all cameras in a current synchronization network by the way of network broadcasting;

a transmission delay acquiring module, configured to acquire transmission delay of signals between each camera;

a photographing instruction generating module, configured to generate a synchronization photographing instruction of each camera according to the transmission delay of signals between each camera; and a photographing module, configured to transmit the synchronization photographing instruction to the corresponding camera by means of a wireless network so as to realize frame synchronization photographing for all the cameras in a multi-camera system.

In the photographing synchronization device of the present disclosure, the network broadcasting of mDNS is configured to acquire all the cameras in the current synchronization network.

In the photographing synchronization device of the present disclosure, the D-bus communication mechanism is used to send the synchronization photographing instruction to the corresponding camera.

In the photographing synchronization device of the present disclosure, the current synchronization network composed of all the cameras is a peer to peer networking.

In the photographing synchronization device of the present disclosure, the wireless network comprises: a Zigbee wireless communication network, a Wi-Fi wireless network or a Bluetooth wireless network.

Compared with the photographing synchronization device and photographing synchronization method in the existing technology, in the photographing synchronization method and the photographing synchronization device of the present disclosure, all the cameras in the current synchronization network are obtained by the way of network broadcasting, and all the cameras are controlled to photograph by the way of frame synchronization; the installation process and use process of the multi-camera system are greatly simplified, and the production cost of the multi-camera system is reduced. Thus, the photographing synchronization device in this present disclosure solves the technical problems in the existing photographing synchronization device, such as difficulty of installation, inconvenience of use, and higher production cost of the corresponding multi-camera system.

BRIEF DESCRIPTION OF THE DRAWINGS

The aforementioned features and advantages of the disclosure as well as additional features and advantages thereof will be more clearly understood hereinafter as a result of a detailed description of preferred embodiment when taken in conjunction with the drawings.

DETAILED DESCRIPTION

The present disclosure is hereinafter described further in detail with reference to the accompanying drawings so as to make the objective, technical solution, and merits of exemplary embodiments more apparent. The term "exemplary" used throughout this description means "serving as an instance, instance, or illustration," and should not necessarily be construed as preferred or advantageous over other exemplary embodiments. It would be apparent that a person having ordinary skills in the art may obtain other embodiments based on the illustrated exemplary embodiments of the disclosure without paying any creative work, and these embodiments should also be within the protection scope sought by the present disclosure.

The photographing synchronization method provided in the present disclosure can be used to perform synchronization photographing operation for cameras in a multi-camera system, and can also can be applied to a photographing electronic equipment composed by various kinds of multi-camera systems. With the aid of the photographing synchronization method, a user can control the cameras in the multi-camera systems for synchronization photographing operation, and the cameras in the whole multi-camera systems do not need to be connected to additional cables, so that the installation of the multi-camera systems is simple. In this embodiment of the present disclosure, any camera in the multi-camera system can be configured to control all the cameras, therefore, the multi-camera system is easy to operate. In addition, due to the hardware simplified, so that the production cost of the multi-camera system decreases.

Figure 1:
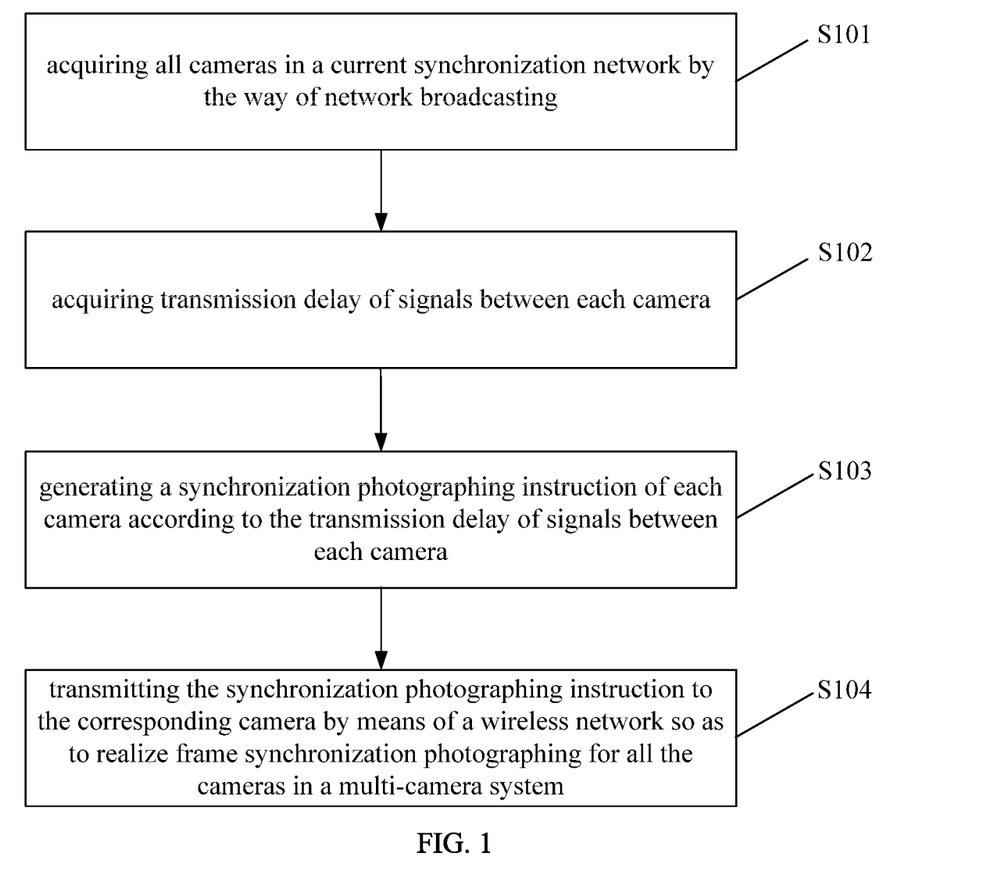
FIG. 1 is a flowchart of a photographing synchronization method provided in a first embodiment of the present disclosure.

Referring to FIG. 1, FIG. 1 is a flowchart of a photographing synchronization method provided in a first embodiment of the present disclosure. The photographing synchronization method can be employed by the above mentioned photographing electronic equipment, namely, the photographing electronic equipment can execute the photographing synchronization method. In this embodiment, the photographing synchronization method can include the following steps.

Step S101, acquiring all cameras in a current synchronization network by the way of network broadcasting.

Step S102, acquiring transmission delay of signals between each camera.

Step S103, generating a synchronization photographing instruction of each camera according to the transmission delay of signals between each camera.

Step S104, transmitting the synchronization photographing instruction to the corresponding camera by means of a wireless network so as to realize frame synchronization photographing for all the cameras in a multi-camera system.

The detailed processes of each step in the photographing synchronization method of the present disclosure is hereinafter described further in detail.

In step S101, all the cameras are first set in the current synchronization network by the way of network broadcasting, so as to control all the camera in the current synchronization network to realize the frame synchronization photographing. In order that a user can control all the other cameras in the current synchronization network by means of any camera, in this embodiment, the current synchronization network can be a peer to peer (P2P) networking which is a distributed application architecture that partitions tasks or workloads between peers. That is, the current synchronization network does not exist center nodes (namely, center cameras), then each camera in the current synchronization network can send a control signal or receive a control signal.

After that, a photographing synchronization device can employ any camera in the current synchronization network to obtain all the cameras in the current synchronization network by the way of network broadcasting, namely, to find and analyze network addresses of all the cameras in the current synchronization network. In this embodiment, the network broadcasting of multicast DNS (mDNS) is used here to acquire all the cameras in the current synchronization network, so that there is no need to set special DNS servers, thereby further reducing the production cost of the photographing electronic equipment. Then the step S102 is hereinafter described further in detail.

In step S102, when the photographing synchronization device obtains the transmission delay of signals among all the cameras in the current synchronization network as analyzed in step S101, since each camera in the current synchronization network can send the control signal, and also can receive the control signal, so that the transmission delay of signals between two cameras of all the cameras in the current synchronization network in this step can be acquired in order to photograph later by the way of frame synchronization. Then the step S103 is hereinafter described further in detail.

In step S103, the photographing synchronization device generates the synchronization photographing instruction corresponding to each camera according to the transmission delay of signals between each camera as obtained in step S102. The synchronization photographing instruction can be directed transmitted to the corresponding camera, and also can be transmitted to the corresponding camera by means of other cameras. In this embodiment of the present disclosure, the D-bus communication mechanism can be preferably used to send the synchronization photographing instruction to the corresponding camera, so as to simplify the communication process of the synchronization photographing instruction. Then the step S104 is hereinafter described further in detail.

In step S104, the photographing synchronization device directly or indirectly sends the synchronization photographing instruction obtained in step S103 to the corresponding camera by means of the wireless network. Because the synchronization photographing instruction includes the corresponding transmission delay of signals, so that each camera can realize the frame synchronization photographing based on the synchronization photographing instruction. In this embodiment of the present disclosure, the wireless network includes, but not limited to, a Zigbee wireless communication network, a Wi-Fi wireless network or a Bluetooth wireless network.

Finally, the photographing synchronization device can obtain frame synchronization photographing images and synchronize the frame synchronization photographing images to other electronic terminal devices, such as an observer client terminal device, so that the user can watch the frame synchronization photographing images in real time.

According to the described above, the photographing process of the frame synchronization photographing images is completed according to the photographing synchronization method of the present disclosure.

According to the photographing synchronization method of the embodiment in the present disclosure, all the cameras in the current synchronization network are obtained by the way of network broadcasting, and all the cameras are controlled to photograph by the way of frame synchronization, which can greatly simplify the installation process and use process of the multi-camera system, and reduce the production cost of the multi-camera system.

Figure 2:
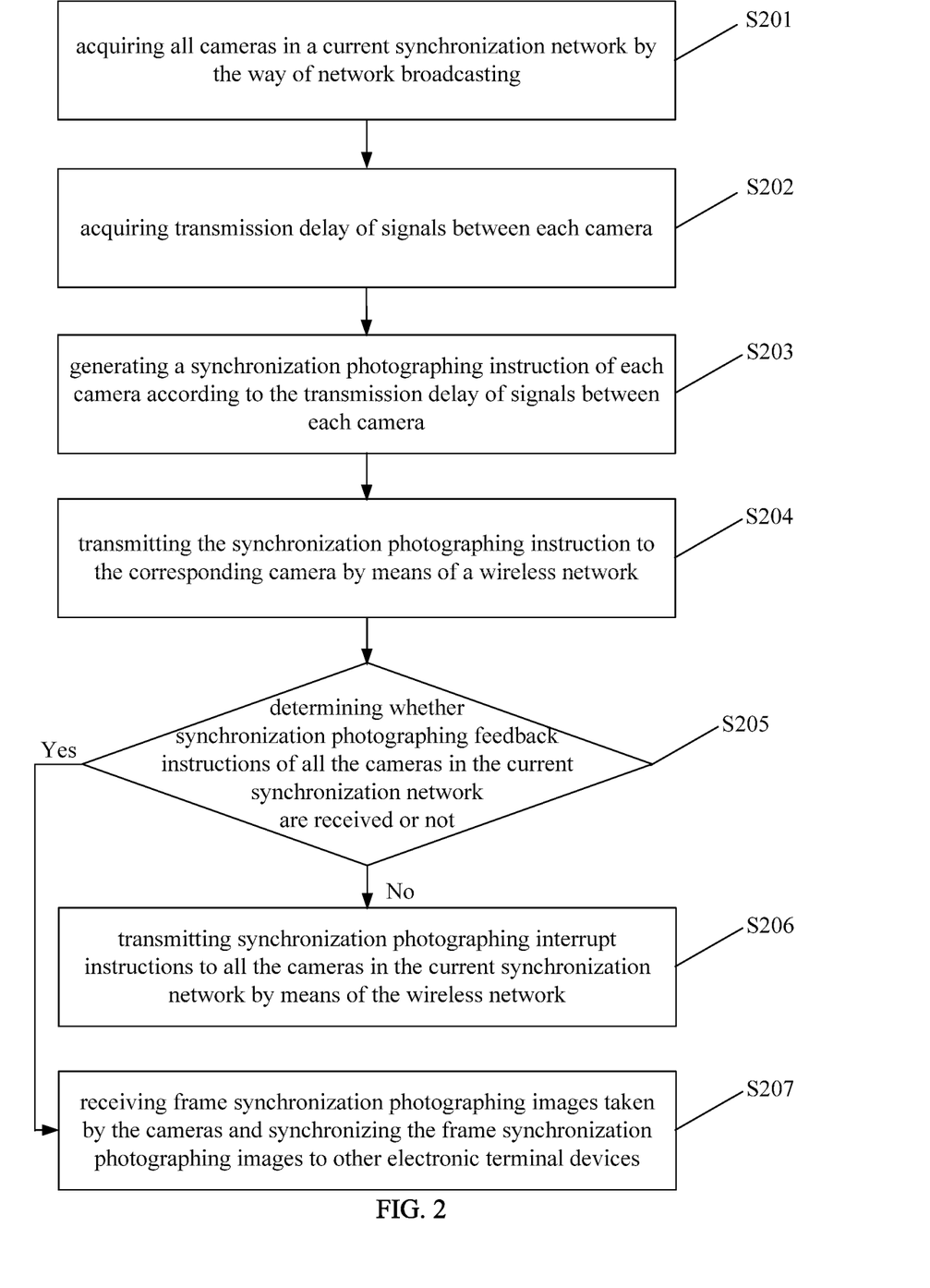
FIG. 2 is a flowchart of a photographing synchronization method provided in a second embodiment of the present disclosure.

Referring to FIG. 2, FIG. 2 is a flowchart of a photographing synchronization method provided in a second embodiment of the present disclosure. In this embodiment, the photographing synchronization method can be employed by the above-mentioned photographing electronic equipment, namely, the photographing electronic equipment can execute the photographing synchronization method. In this embodiment, the photographing synchronization method can include the following steps.

Step S201, acquiring all cameras in a current synchronization network by the way of network broadcasting.

Step S202, acquiring transmission delay of signals between each camera.

Step S203, generating a synchronization photographing instruction of each camera according to the transmission delay of signals between each camera.

Step S204, transmitting the synchronization photographing instruction to the corresponding camera by means of a wireless network.

Step S205, determining whether synchronization photographing feedback instructions of all the cameras in the current synchronization network are received or not, wherein, the synchronization photographing feedback instruction can be generated by the camera according to the synchronization photographing instruction; if the synchronization photographing feedback instructions of all the cameras in the current synchronization network are not received in a predetermined time, step S206 will be executed; if the synchronization photographing feedback instructions of all the cameras in the current synchronization network are received in the predetermined time, step S207 will be executed.

Step S206, transmitting synchronization photographing interrupt instructions to all the cameras in the current synchronization network by means of the wireless network.

Step S207, receiving frame synchronization photographing images taken by the cameras and synchronizing the frame synchronization photographing images to other electronic terminal devices.

The detailed processes of each step in the photographing synchronization method of the present disclosure is hereinafter described further in detail.

The description of the step S201 is the same as or similar to the description of the step S101 in the photographing synchronization method as provided in the first embodiment of the present disclosure, please refer to the related description about the step S101 in the photographing synchronization method as provided in FIG. 1 of the present disclosure, which need not be repeated here.

In step S202, when the photographing synchronization device obtains the transmission delay of signals among all the cameras in the current synchronization network as analyzed in step S101, since each camera in the current synchronization network can send the control signal, and also can receive the control signal, so that the transmission delay of signals between two cameras of all the cameras in the current synchronization network in this step can be acquired in order to photograph later by the way of frame synchronization.

In detail, the step of acquiring transmission delay of signals between each camera, can include the following steps.

Step S2021A, establishing at least once handshake connection between two cameras.

Step S2022A, determining the transmission delay of signals between two camera according to the handshake connection time of establishing the handshake connection as described in step S2021A. In this embodiment, in order to avoid detection error because of only once handshake connection, multiple handshake connections should be established between two cameras, then calculating the average of multiple handshake connection time can determine the transmission delay of signals between two camera.

Moreover, the step of acquiring transmission delay of signals between each camera, can also include the following steps.

Step S2021B, obtaining a public feature point in a photographing public area of two cameras, wherein, the public feature point can be an easily recognizable pixel point, for example, a red mark point gradually appearing in an image with white background, and so on.

Step S2022B, determining the transmission delay of signals between two camera according to a time difference that the public feature point obtained in step S2021B appears in the images photographed by the two cameras. For instance, the time that a red mark point appears in the camera A is 10 millisecond (ms), and the time that it appears in the camera B is 12 ms, so it can be determined that the time difference that the public feature point appears in the images is 2 ms, namely, the transmission delay of signals between the camera A and the camera B is 2 ms. It should be understood that more public feature points, such as, 3, 4, 6, and 7 public feature points, can be used to determine the transmission delay of signals between two cameras, so as to reduce or avoid the detection error of single detection. Then the step S203 is hereinafter described further in detail.

The description of the step S203 is the same as or similar to the description of the step S103 in the photographing synchronization method as provided in the first embodiment of the present disclosure, please refer to the related description about the step S103 in the photographing synchronization method as provided in FIG. 1 of the present disclosure, which need not be repeated here.

The description of the step S204 is the same as or similar to the description of the step S104 in the photographing synchronization method as provided in the first embodiment of the present disclosure, please refer to the related description about the step S104 in the photographing synchronization method as provided in FIG. 1 of the present disclosure, which need not be repeated here.

In step S205, the photographing synchronization device determines whether the synchronization photographing feedback instructions of all the cameras in the current synchronization network are received or not. The synchronization photographing feedback instruction can be generated by the camera according to the synchronization photographing instruction, and is used to prove that the camera has received the corresponding synchronization photographing instruction. For example, if the synchronization photographing feedback instructions of all the cameras in the current synchronization network are not received in a predetermined time, step S206 will be executed; if the synchronization photographing feedback instructions of all the cameras in the current synchronization network are received in the predetermined time, step S207 will be executed.

In step S206, if the photographing synchronization device does not receive the synchronization photographing feedback instructions of all the cameras in the current synchronization network in the predetermined time, it means that at least part of cameras has not received the synchronization photographing instruction, then the photographing synchronization device sends the synchronization photographing interrupt instructions to all the cameras in the current synchronization network by means of the wireless network to control all the cameras in the multi-camera system to stop the frame synchronization photographing, so that the cameras can photograph again after the technical personnel examines and repairs the cameras which do not send the synchronization photographing feedback instructions.

In step S207, if the photographing synchronization device has received the synchronization photographing feedback instructions of all the cameras in the current synchronization network in the predetermined time, it means that all the cameras have been prepared for frame synchronization photographing, and then all the cameras in the multi-camera system start to photograph based on the frame synchronization; then the photographing synchronization device receives the frame synchronization photographing images from the cameras, and synchronizes the frame synchronization photographing images to other electronic terminal devices, such as an observer client terminal device, so that the user can watch the frame synchronization photographing images in real time.

According to the described above, the photographing process of the frame synchronization photographing images is completed according to the photographing synchronization method of the present disclosure.

On the basis of the first embodiment, the photographing synchronization method of the second embodiment in the present disclosure can determine whether to execute the frame synchronization photographing according to the synchronization photographing feedback instructions, thereby further improving the success rate for frame synchronization photographing of the multi-camera system.

Figure 3:
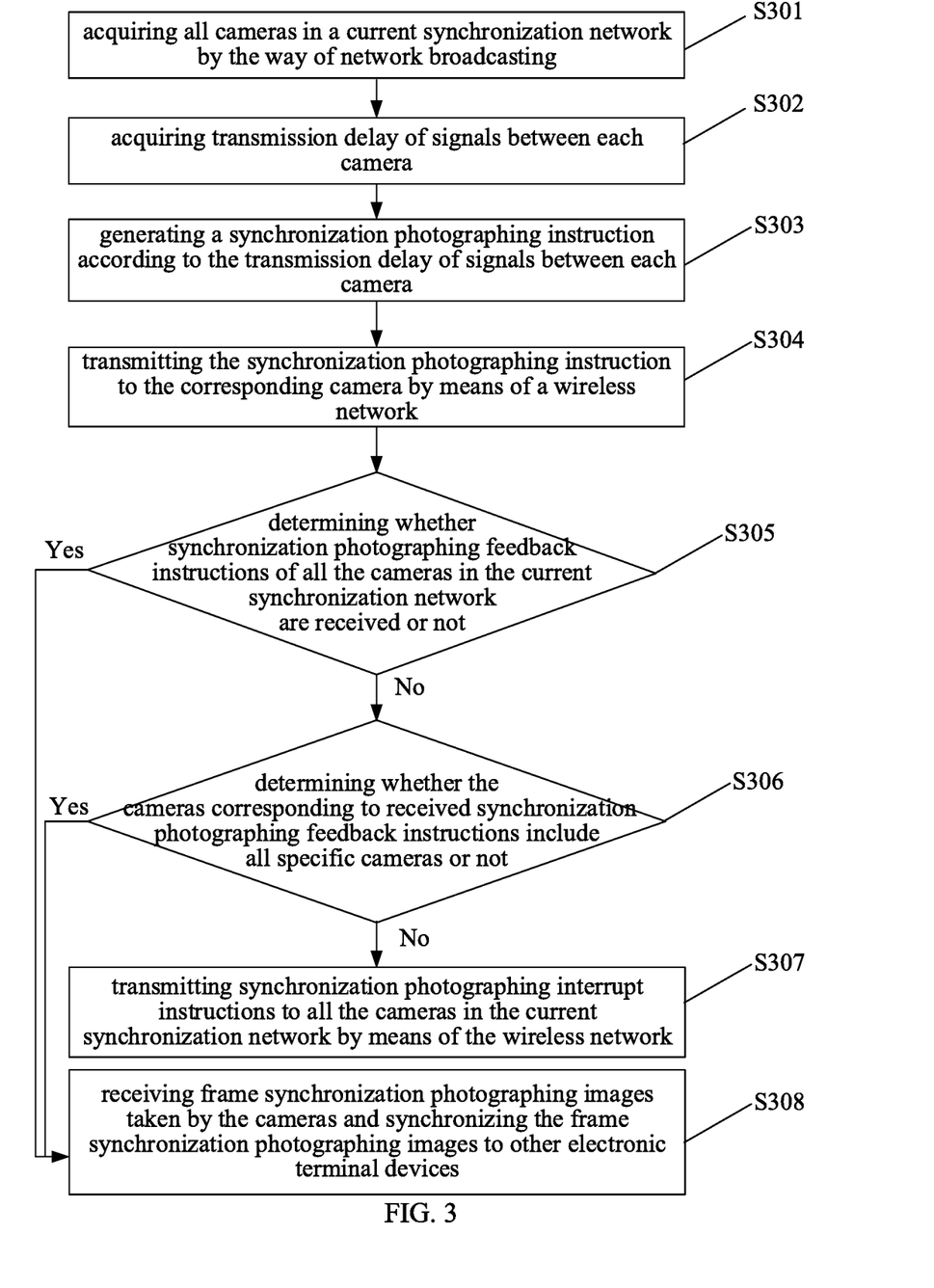
FIG. 3 is a flowchart of a photographing synchronization method provided in a third embodiment of the present disclosure.

Referring to FIG. 3, FIG. 3 is a flowchart of a photographing synchronization method provided in a third embodiment of the present disclosure. In this embodiment, the photographing synchronization method can be employed by the above-mentioned photographing electronic equipment, namely, the photographing electronic equipment can execute the photographing synchronization method. In this embodiment, the photographing synchronization method can include the following steps.

Step S301, acquiring all cameras in a current synchronization network by the way of network broadcasting.

Step S302, acquiring transmission delay of signals between each camera.

Step S303, generating a synchronization photographing instruction according to the transmission delay of signals between each camera.

Step S304, transmitting the synchronization photographing instruction to the corresponding camera by means of a wireless network.

Step S305, determining whether synchronization photographing feedback instructions of all the cameras in the current synchronization network are received or not, wherein, the synchronization photographing feedback instruction can be generated by the camera according to the synchronization photographing instruction; if the synchronization photographing feedback instructions of all the cameras in the current synchronization network are not received in a predetermined time, step S306 will be executed; if the synchronization photographing feedback instructions of all the cameras in the current synchronization network are received in the predetermined time, step S308 will be executed.

Step S306, determining whether the cameras corresponding to received synchronization photographing feedback instructions include all specific cameras or not; if the cameras do not include all specific cameras, then step S307 will be executed; if the cameras include all the specific cameras, then step S308 will be executed.

Step S307, transmitting synchronization photographing interrupt instructions to all the cameras in the current synchronization network by means of the wireless network when the cameras corresponding to received synchronization photographing feedback instructions do not include all the specific cameras.

Step S308, receiving frame synchronization photographing images taken by the cameras and synchronizing the frame synchronization photographing images to other electronic terminal devices when the synchronization photographing feedback instructions of all the cameras in the current synchronization network are received in the predetermined time, or the cameras corresponding to received synchronization photographing feedback instructions include all the specific cameras.

The detailed processes of each step in the photographing synchronization method of the present disclosure is hereinafter described further in detail.

The description of the step S301 is the same as or similar to the description of the step S201 in the photographing synchronization method as provided in the second embodiment of the present disclosure, please refer to the related description about the step S201 in the photographing synchronization method as provided in FIG. 2 of the present disclosure.

The description of the step S302 is the same as or similar to the description of the step S202 in the photographing synchronization method as provided in the second embodiment of the present disclosure, please refer to the related description about the step S202 in the photographing synchronization method as provided in FIG. 2 of the present disclosure.

The description of the step S303 is the same as or similar to the description of the step S203 in the photographing synchronization method as provided in the second embodiment of the present disclosure, please refer to the related description about the step S203 in the photographing synchronization method as provided in FIG. 2 of the present disclosure.

The description of the step S304 is the same as or similar to the description of the step S204 in the photographing synchronization method as provided in the second embodiment of the present disclosure, please refer to the related description about the step S204 in the photographing synchronization method as provided in FIG. 2 of the present disclosure.

In step S305, the photographing synchronization device determines whether the synchronization photographing feedback instructions of all the cameras in the current synchronization network are received or not. The synchronization photographing feedback instruction can be generated by the camera according to the synchronization photographing instruction, and is used to prove that the camera has received the corresponding synchronization photographing instruction. For example, if the synchronization photographing feedback instructions of all the cameras in the current synchronization network are not received in a predetermined time, step S306 will be executed; if the synchronization photographing feedback instructions of all the cameras in the current synchronization network are received in the predetermined time, step S308 will be executed.

In step S306, the photographing synchronization device can determine whether the cameras corresponding to received synchronization photographing feedback instructions include all specific cameras or not. The specific camera here is a necessary camera for executing the frame synchronization photographing. That is, in this embodiment, the multi-camera system can include multiple necessary cameras and multiple unnecessary cameras is the camera configured for executing the frame synchronization photographing so as to achieve panoramic images, such as, the camera located on the front side of the photographing synchronization device, the camera having an important angle, and so on. The unnecessary camera is the camera used for taking pictures including secondary contents, such as, the camera located on the back side of the photographing synchronization device. Thus, the secondary contents of the unnecessary cameras will not have any material impact on the frame synchronization photographing images of the necessary cameras, such as resulting in a decline in the definition of the frame synchronization photographing images. When the photographing synchronization device determines that the cameras corresponding to the received synchronization photographing feedback instructions do not include all specific cameras, then the step S307 will be executed; when the photographing synchronization device determines that the cameras corresponding to the received synchronization photographing feedback instructions include all specific cameras, then the step S308 will be executed.

In step S307, when the photographing synchronization device determines that the cameras corresponding to the received synchronization photographing feedback instructions do not include all specific cameras, it means that at least part of cameras has not received the synchronization photographing instruction, then the photographing synchronization device sends the synchronization photographing interrupt instructions to all the cameras in the current synchronization network by means of the wireless network to control all the cameras in the multi-camera system to stop the frame synchronization photographing, so that the cameras can photograph again after the technical personnel examines and repairs the cameras which do not send the synchronization photographing feedback instructions.

In step S308, when the photographing synchronization device receives the synchronization photographing feedback instructions of all the cameras in the current synchronization network during the predetermined time, or the photographing synchronization device determines that the cameras corresponding to received synchronization photographing feedback instructions include all the specific cameras, it means that all the specific cameras have been prepared for frame synchronization photographing, and then all the cameras in the multi-camera system start to photograph based on the frame synchronization; after that the photographing synchronization device receives the frame synchronization photographing images from the cameras, and synchronizes the frame synchronization photographing images to other electronic terminal devices, such as an observer client terminal device, so that the user can watch the frame synchronization photographing images in real time.

According to the described above, the photographing process of the frame synchronization photographing images is completed according to the photographing synchronization method of the present disclosure.

On the basis of the second embodiment, the photographing synchronization method of the second embodiment in the present disclosure can determine whether to execute the frame synchronization photographing on the basis of determining the synchronization photographing feedback instructions of the specific cameras, thereby further improving the success rate for frame synchronization photographing of the multi-camera system compared with the second embodiment.

Figure 4:
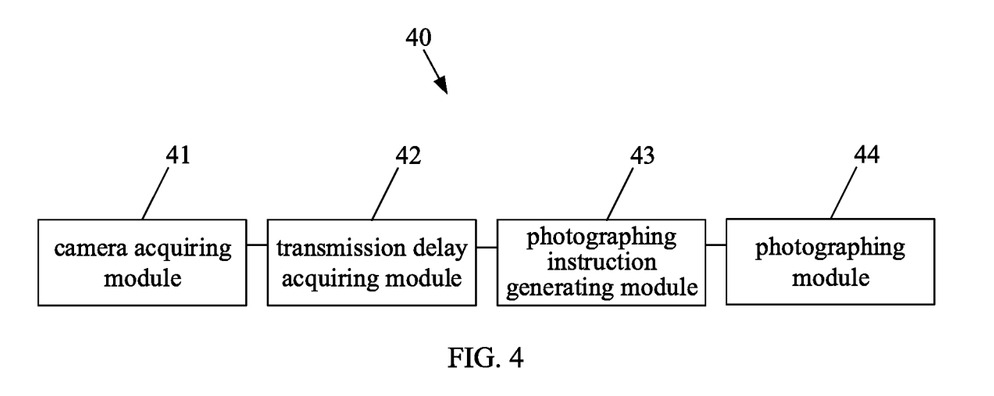
FIG. 4 is a block diagram of a photographing synchronization device provided in one embodiment of the present disclosure.

The present disclosure also provides a photographing synchronization device. Referring to FIG. 4, FIG. 4 is a block diagram of a photographing synchronization device provided in one embodiment of the present disclosure. The photographing synchronization device can execute the photographing synchronization method provided in the embodiments of the present disclosure. In this embodiment, the photographing synchronization device 40 includes a camera acquiring module 41, a transmission delay acquiring module 42, a photographing instruction generating module 43, and a photographing module 44.

In this embodiment, the camera acquiring module 41 is configured to acquire all cameras in a current synchronization network by the way of network broadcasting; the transmission delay acquiring module 42 is configured to acquire transmission delay of signals between each camera; the photographing instruction generating module 43 is configured to generate a synchronization photographing instruction of each camera according to the transmission delay of signals between each camera; and the photographing module 44 is configured to transmit the synchronization photographing instruction to the corresponding camera by means of a wireless network so as to realize frame synchronization photographing for all the cameras in a multi-camera system.

In use of the photographing synchronization device 40 of the embodiment in the present disclosure, all the cameras are first set in the current synchronization network by the way of network broadcasting, so as to control all the camera in the current synchronization network to realize the frame synchronization photographing. In this embodiment, in order that a user can control all the other cameras in the current synchronization network by means of any camera, the current synchronization network can be a peer to peer (P2P) networking which is a distributed application architecture that partitions tasks or workloads between peers. That is, the current synchronization network does not exist center nodes (namely, center cameras), then each camera in the current synchronization network can send a control signal or receive a control signal.

After that, the camera acquiring module 41 can employ any camera in the current synchronization network to obtain all the cameras in the current synchronization network by the way of network broadcasting, namely, to find and analyze network addresses of all the cameras in the current synchronization network. In this embodiment, the network broadcasting of multicast DNS (mDNS) is used here to acquire all the cameras in the current synchronization network, so that there is no need to set special DNS servers, thereby further reducing the production cost of the photographing electronic equipment.

Then the transmission delay acquiring module 42 obtains the transmission delay of signals among all the cameras in the current synchronization network, and the transmission delay of signals among all the cameras is analyzed by the camera acquiring module 41. Since each camera in the current synchronization network can send the control signal, and also can receive the control signal, so that the transmission delay acquiring module 42 can acquire the transmission delay of signals between two cameras of all the cameras in the current synchronization network, so as to photograph later by the way of frame synchronization.

After that, the photographing instruction generating module 43 generates the synchronization photographing instruction corresponding to each camera according to the transmission delay of signals between each camera obtained by the transmission delay acquiring module 42. The synchronization photographing instruction can be directed transmitted to the corresponding camera, and also can be transmitted to the corresponding camera by means of other cameras. In this embodiment of the present disclosure, the D-bus communication mechanism can be preferably used to send the synchronization photographing instruction to the corresponding camera, so as to simplify the communication process of the synchronization photographing instruction.

The photographing module 44 directly or indirectly sends the synchronization photographing instruction obtained by the photographing instruction generating module 43 to the corresponding camera by means of the wireless network. Since the synchronization photographing instruction includes the corresponding transmission delay of signals, so that each camera can realize the frame synchronization photographing based on the synchronization photographing instruction. In this embodiment of the present disclosure, the wireless network includes, but not limited to, a Zigbee wireless communication network, a Wi-Fi wireless network or a Bluetooth wireless network.

Finally, the photographing synchronization device 40 can obtain frame synchronization photographing images and synchronize the frame synchronization photographing images to other electronic terminal devices, such as an observer client terminal device, so that the user can watch the frame synchronization photographing images in real time.

According to the described above, the photographing process of the frame synchronization photographing images is completed according to the photographing synchronization device 40 of the present disclosure.

According to the photographing synchronization method and the photographing synchronization device of the embodiment in the present disclosure, all the cameras in the current synchronization network are obtained by the way of network broadcasting, and all the cameras are controlled to photograph by the way of frame synchronization; the installation process and use process of the multi-camera system are greatly simplified, and the production cost of the multi-camera system is reduced. Thus, the photographing synchronization device in this present disclosure solves the technical problems in the existing photographing synchronization device, such as difficulty of installation, inconvenience of use, and higher production cost of the corresponding multi-camera system.

In conclusion, the foregoing descriptions are merely exemplary embodiments of the present disclosure, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

What is claimed is:

1. A photographing synchronization method, using any camera in a multi-camera system to control multiple cameras for synchronization photographing operation, wherein, the photographing synchronization method comprises:
    acquiring all cameras in a current synchronization network by the way of network broadcasting;
    obtaining a public feature point in a photographing public area of two cameras, wherein the public feature point is a recognizable pixel point;
    determining transmission delay of signals between the two camera according to a time difference that the public feature point appears in images photographed by the two cameras;
    generating a synchronization photographing instruction of each camera according to the transmission delay of signals between each camera;
    transmitting the synchronization photographing instruction to the corresponding camera by means of a wireless network;
    determining whether synchronization photographing feedback instructions of all the cameras in the current synchronization network are received or not, wherein, the synchronization photographing feedback instruction is generated by the camera according to the synchronization photographing instruction;
    determining whether the cameras corresponding to received synchronization photographing feedback instructions include all specific cameras or not when the synchronization photographing feedback instructions of all the cameras in the current synchronization network are not received in a predetermined time; and
    transmitting synchronization photographing interrupt instructions to all the cameras in the current synchronization network by means of the wireless network when the cameras corresponding to received synchronization photographing feedback instructions do not include all the specific cameras.

2. The photographing synchronization method of claim 1, further comprising:
    receiving frame synchronization photographing images taken by the cameras and synchronizing the frame synchronization photographing images to other electronic terminal devices.

3. The photographing synchronization method of claim 1, wherein, the network broadcasting of mDNS is used to acquire all the cameras in the current synchronization network; the D-bus communication mechanism is used to send the synchronization photographing instruction to the corresponding camera.

4. The photographing synchronization method of claim 1, wherein, the current synchronization network composed of all the cameras is a peer to peer networking; the wireless network comprises: a Zigbee wireless communication network, a Wi-Fi wireless network or a Bluetooth wireless network.

5. A photographing synchronization method, using any camera in a multi-camera system to control multiple cameras for synchronization photographing operation, wherein, the photographing synchronization method comprises:
    acquiring all cameras in a current synchronization network by the way of network broadcasting;
    acquiring transmission delay of signals between each camera, comprising obtaining a public feature point in a photographing public area of two cameras, wherein the public feature point is a recognizable pixel point;

generating a synchronization photographing instruction of each camera according to the transmission delay of signals between each camera; and transmitting the synchronization photographing instruction to the corresponding camera by means of a wireless network so as to realize frame synchronization photographing for all the cameras in the multi-camera system.

6. The photographing synchronization method of claim 5, the step of acquiring transmission delay of signals between each camera, comprising:

establishing at least once handshake connection between two cameras; and determining the transmission delay of signals between two camera according to the handshake connection time of establishing the handshake connection between the two cameras.

7. The photographing synchronization method of claim 5, the step of acquiring transmission delay of signals between each camera, further comprising:

determining the transmission delay of signals between two camera according to a time difference that the public feature point appears in the images photographed by the two cameras.

8. The photographing synchronization method of claim 5, further comprising:

determining whether synchronization photographing feedback instructions of all the cameras in the current synchronization network are received or not, wherein, the synchronization photographing feedback instruction is generated by the camera according to the synchronization photographing instruction; and transmitting synchronization photographing interrupt instructions to all the cameras in the current synchronization network by means of the wireless network when the synchronization photographing feedback instructions of all the cameras in the current synchronization network are not received in a predetermined time.

9. The photographing synchronization method of claim 8, further comprising:

determining whether synchronization photographing feedback instructions of all the cameras in the current synchronization network are received or not, wherein, the synchronization photographing feedback instruction is generated by the camera according to the synchronization photographing instruction;

determining whether the cameras corresponding to received synchronization photographing feedback instructions include all specific cameras or not when the synchronization photographing feedback instructions of all the cameras in the current synchronization network are not received in the predetermined time; and transmitting synchronization photographing interrupt instructions to all the cameras in the current synchronization network by means of the wireless network when the cameras corresponding to received synchronization photographing feedback instructions do not include all the specific cameras.

10. The photographing synchronization method of claim 5, further comprising:

receiving frame synchronization photographing images taken by the cameras and synchronizing the frame synchronization photographing images to other electronic terminal devices.

11. The photographing synchronization method of claim 5, wherein, the network broadcasting of mDNS is used to acquire all the cameras in the current synchronization network.

12. The photographing synchronization method of claim 5, wherein, the D-bus communication mechanism is used to send the synchronization photographing instruction to the corresponding camera.

13. The photographing synchronization method of claim 5, wherein, the current synchronization network composed of all the cameras is a peer to peer networking.

14. The photographing synchronization method of claim 5, wherein, the wireless network comprises: a Zigbee wireless communication network, a Wi-Fi wireless network or a Bluetooth wireless network.

15. A photographing synchronization device, comprising:

a camera acquiring module, configured to acquire all cameras in a current synchronization network by the way of network broadcasting;

a transmission delay acquiring module, configured to obtain a public feature point in a photographing public area of two cameras, wherein the public feature point is a recognizable pixel point, and determine transmission delay of signals between the two camera according to a time difference that the public feature point appears in images photographed by the two cameras;

a photographing instruction generating module, configured to generate a synchronization photographing instruction of each camera according to the transmission delay of signals between each camera; and a photographing module, configured to transmit the synchronization photographing instruction to the corresponding camera by means of a wireless network so as to realize frame synchronization photographing for all the cameras in a multi-camera system.

16. The photographing synchronization device of claim 15, wherein, the network broadcasting of mDNS is configured to acquire all the cameras in the current synchronization network.

17. The photographing synchronization device of claim 15, wherein, the D-bus communication mechanism is used to send the synchronization photographing instruction to the corresponding camera.

18. The photographing synchronization device of claim 15, wherein, the current synchronization network composed of all the cameras is a peer to peer networking.

19. The photographing synchronization device of claim 15, wherein, the wireless network comprises: a Zigbee wireless communication network, a Wi-Fi wireless network or a Bluetooth wireless network.

* * * * *